United States Patent
Klein et al.

(10) Patent No.: US 9,505,284 B1
(45) Date of Patent: Nov. 29, 2016

(54) LATERAL-STABILITY PROMOTING SEMI-TRAILER SUSPENSION

(71) Applicants: Jason M. Klein, Nixa, MO (US);
Kevin C. Schlack, Nixa, MO (US)

(72) Inventors: Jason M. Klein, Nixa, MO (US);
Kevin C. Schlack, Nixa, MO (US)

(73) Assignee: Cush Corporation, Nixa, MO (US)

( * ) Notice: Subject to any disclaimer, the term of this patent is extended or adjusted under 35 U.S.C. 154(b) by 0 days.

(21) Appl. No.: 14/547,604

(22) Filed: Nov. 19, 2014

Related U.S. Application Data

(63) Continuation of application No. 13/317,772, filed on Oct. 27, 2011, now Pat. No. 8,919,793, which is a continuation-in-part of application No. 13/068,417, filed on May 10, 2011, now abandoned.

(60) Provisional application No. 61/395,665, filed on May 17, 2010.

(51) Int. Cl.
*B60G 9/02* (2006.01)
(52) U.S. Cl.
CPC ........................... *B60G 9/02* (2013.01)
(58) Field of Classification Search
CPC ........................................................ B60G 9/02
USPC .................................. 280/124.128, 124.125
See application file for complete search history.

(56) References Cited

U.S. PATENT DOCUMENTS

| | | | |
|---|---|---|---|
| 2,901,240 A | 12/1955 | Fikse | 267/189 |
| 3,332,702 A | 7/1967 | Rosenkrands | 208/124.107 |
| 3,625,300 A | 12/1971 | Barenyi | 180/73 |
| 4,415,179 A | 11/1983 | Marinelli | 280/713 |
| 4,500,112 A | 2/1985 | Raidel | 280/693 |
| 4,596,402 A | 6/1986 | Raidel | 280/711 |
| 4,652,009 A | 3/1987 | Ando et al. | 280/701 |
| 4,693,486 A | 9/1987 | Pierce et al. | 280/80.1 |
| 4,714,269 A | 12/1987 | Raidel | 280/683 |
| 5,366,237 A | 11/1994 | Dilling et al. | 280/124.116 |
| 5,375,871 A | 12/1994 | Mitchell et al. | 280/688 |
| 5,690,353 A | 11/1997 | Vandenberg | 280/688 |
| 5,758,898 A | 6/1998 | Gordon et al. | 280/725 |
| 5,988,672 A | 11/1999 | Vandenberg | 280/683 |
| 6,241,266 B1 | 6/2001 | Smith et al. | 280/124.116 |
| 6,557,875 B2 | 5/2003 | Schlosser et al. | 280/124.153 |
| 6,997,468 B2 | 2/2006 | Ziech et al. | 280/93.512 |
| 7,165,777 B2 | 1/2007 | Ziech et al. | 280/124.11 |
| 7,178,816 B2 | 2/2007 | Chan et al. | 280/124.116 |
| 7,267,348 B1 | 9/2007 | Klein et al. | 280/124.128 |

(Continued)

OTHER PUBLICATIONS

Product Brochure of Hendrickson Trailer Suspension Systems, the Intraax® (© 2002) (6 sheets).

(Continued)

*Primary Examiner* — Karen Beck
(74) *Attorney, Agent, or Firm* — Jonathan A. Bay

(57) ABSTRACT

A trailer suspension system has an axle, a pair of frame hanger brackets, dual trailing arm beams, and a spring. The pair of frame hanger brackets are mounted spaced apart underneath the trailer. The dual trailing arm beams are connected rigidly to the axle at one end and resiliently connected to a respective one of the frame hanger brackets with a pivot means bushing at the other end. The spring intermediate the trailing arm beam and the trailer to support the trailer load. Wherein, the axle connection center is the center of the patch that connects the axle to the longitudinal trailing arm beam, thereby reducing the stress on the axle as well as increasing the stability of the suspension system.

9 Claims, 17 Drawing Sheets

(56) References Cited

U.S. PATENT DOCUMENTS

| | | | | |
|---|---|---|---|---|
| 7,347,435 | B2 | 3/2008 | Chalin | 280/124.116 |
| 7,464,948 | B2 | 12/2008 | Ramsey | 208/124.107 |
| 7,717,442 | B2 | 5/2010 | Chalin | 280/124.116 |
| 7,871,093 | B2 | 1/2011 | Ogawa et al. | 280/124.166 |
| 7,896,369 | B2 | 3/2011 | Tomlin et al. | 280/124.116 |
| 7,971,888 | B2 | 7/2011 | Kim | 280/124.116 |
| 8,006,987 | B2 | 8/2011 | Saieg et al. | 280/124.116 |
| 8,333,396 | B2 | 12/2012 | Saieg et al. | 280/124.128 |
| 2001/0020775 | A1* | 9/2001 | Pierce | B60G 7/001 280/124.128 |
| 2004/0256829 | A1 | 12/2004 | Chalin et al. | 280/124.116 |
| 2006/0033304 | A1 | 2/2006 | Saieg et al. | 280/124.128 |
| 2006/0113742 | A1 | 6/2006 | Chan et al. | 280/124.116 |
| 2006/0163834 | A1* | 7/2006 | Brereton | B60G 7/001 280/124.128 |
| 2009/0072505 | A1 | 3/2009 | McGinnis | 280/124.116 |

OTHER PUBLICATIONS

Product Brochure of Ridewell Suspensions, the Monopivot 240 Series (undated) (4 sheets).

Product Brochure of Dana Corporation, the AdVANtage™ (© 2002) (4 sheets).

Product Brochure of ArvinMeritor, Inc., the RideStar™ (© 2001) (4 sheets).

Product Brochure of Reyco Granning Suspensions, the 20AR and 22AR Suspensions, ™ (© 2002) (5 sheets).

Axle Capacity Rating Charts of IMT Corp. (of Ingersoll, Ontario, Canada) (undated) (4 sheets).

* cited by examiner

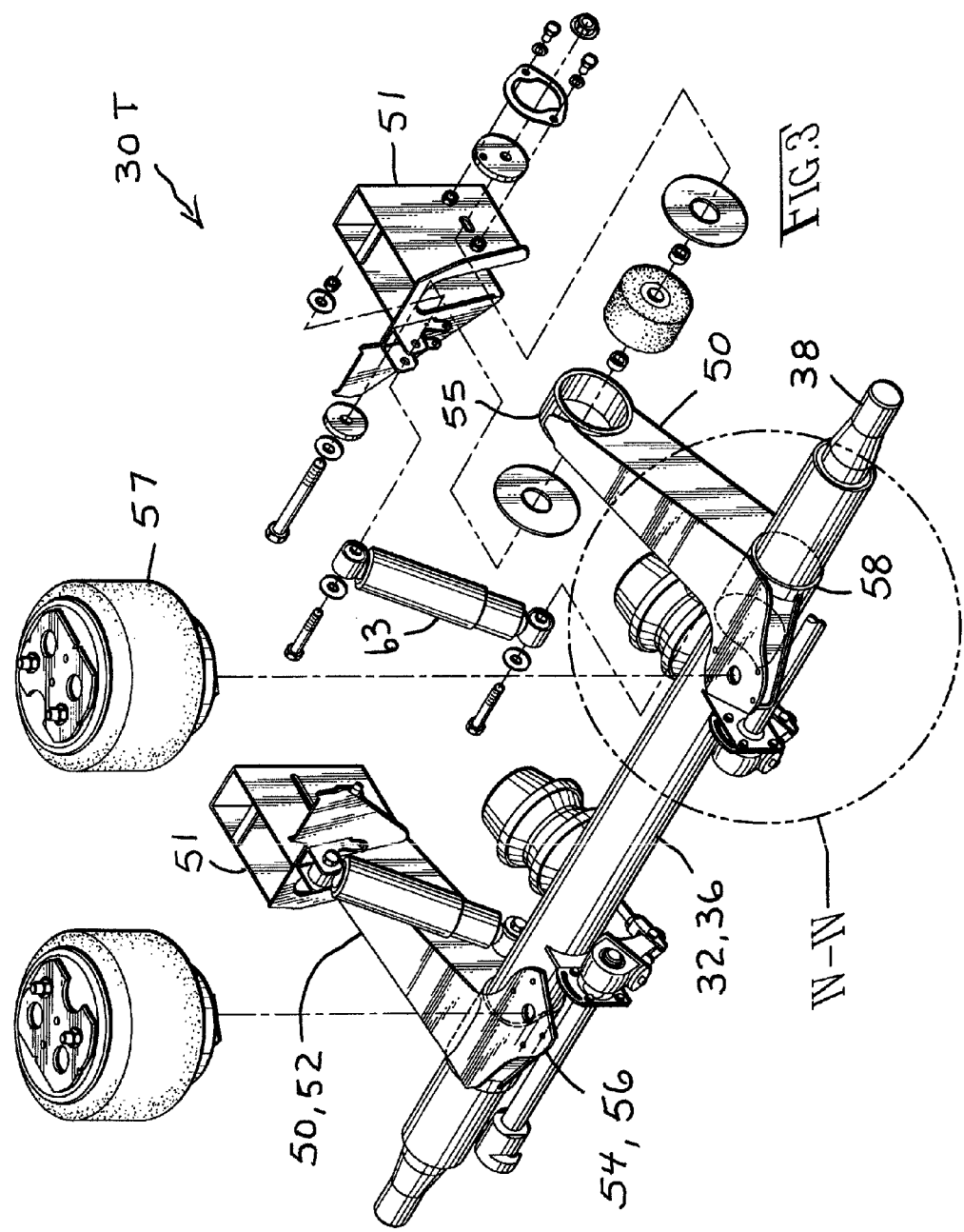

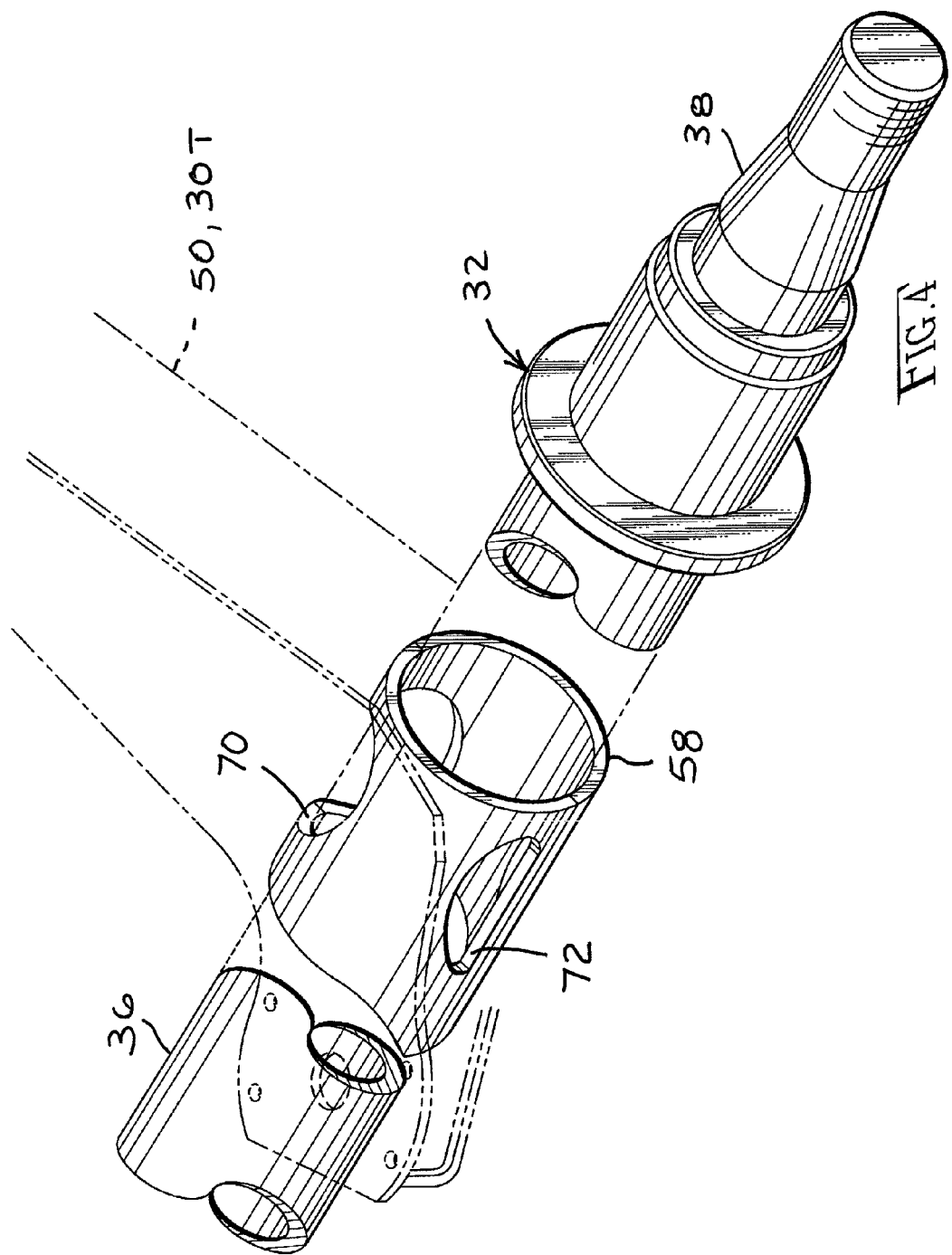

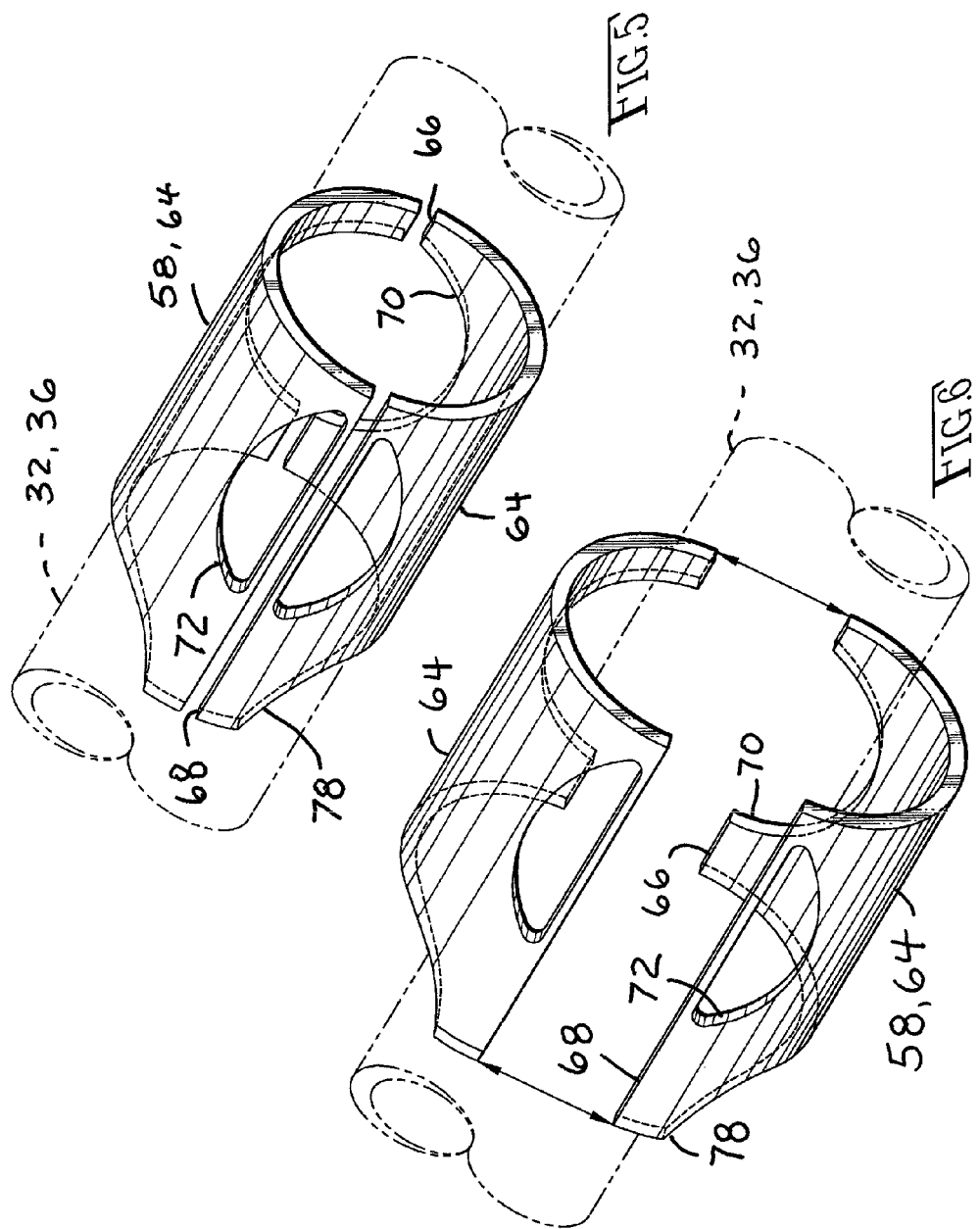

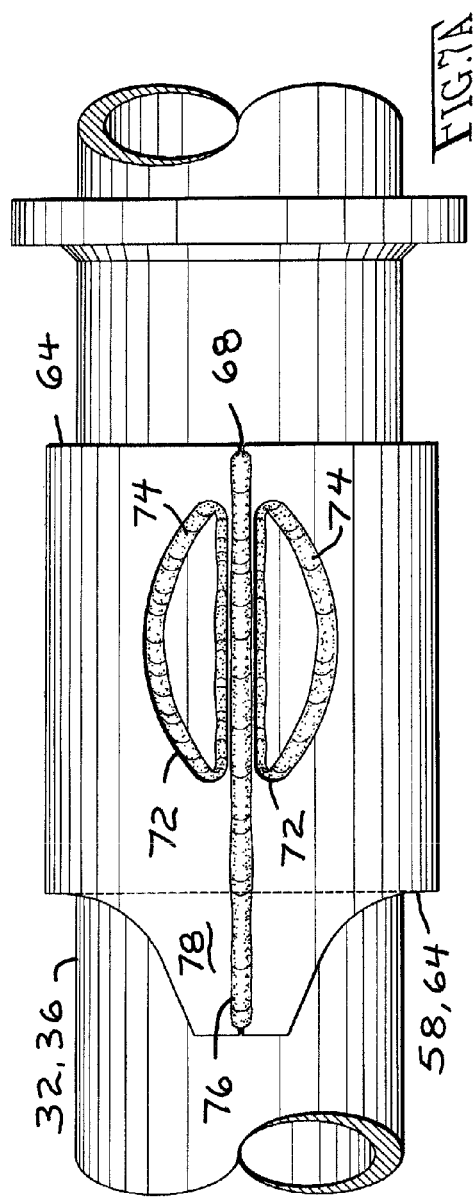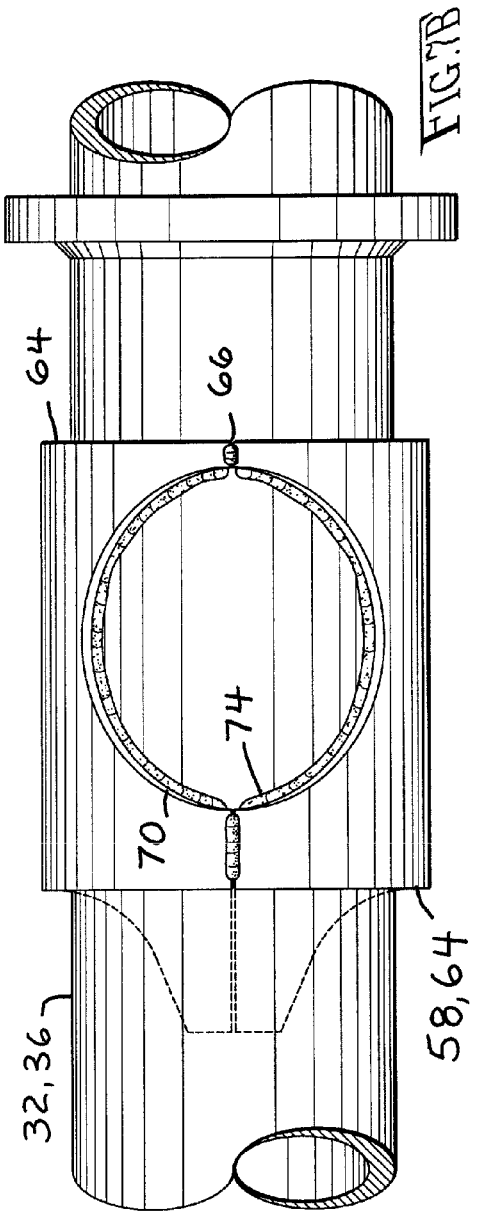

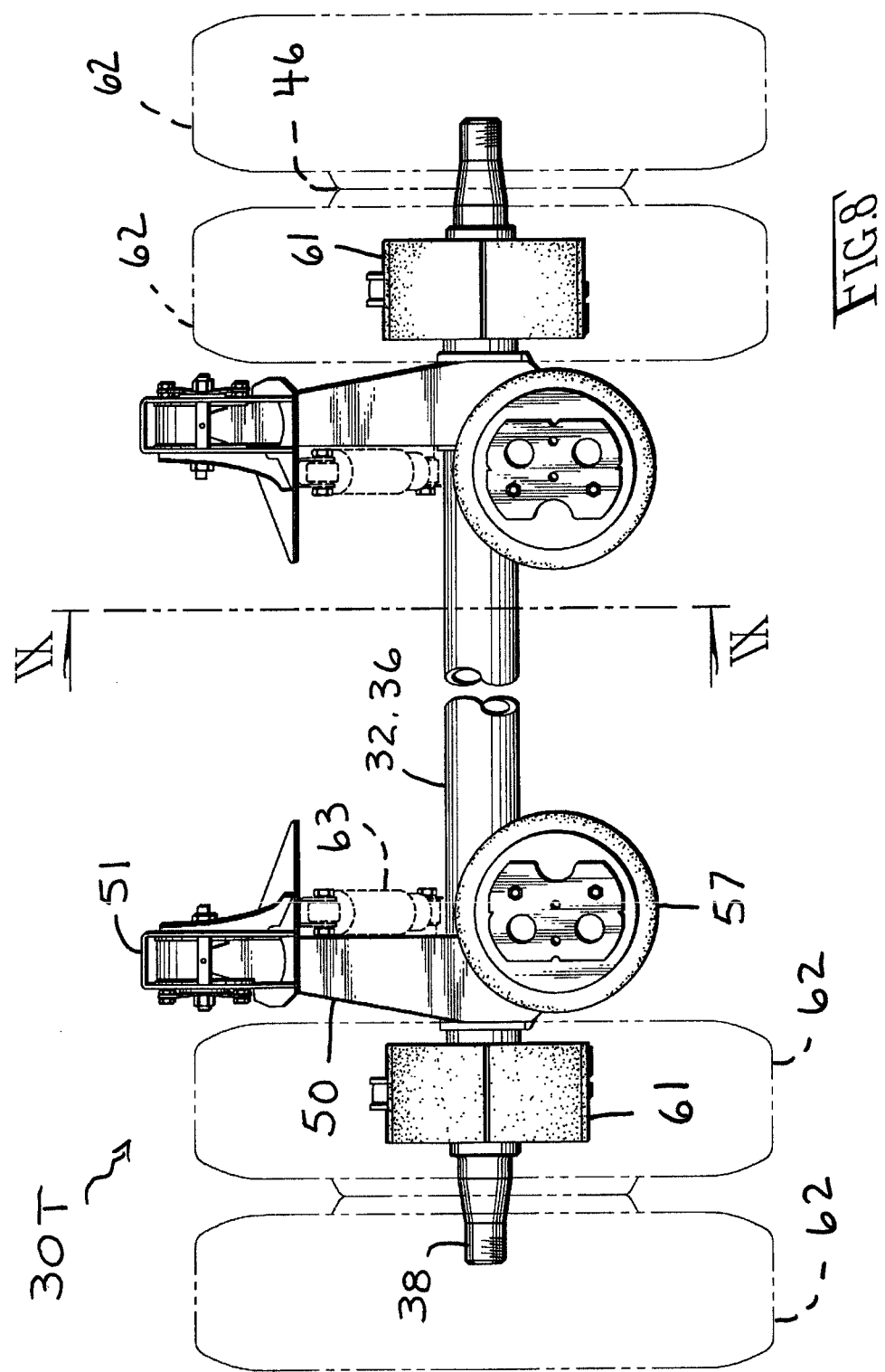

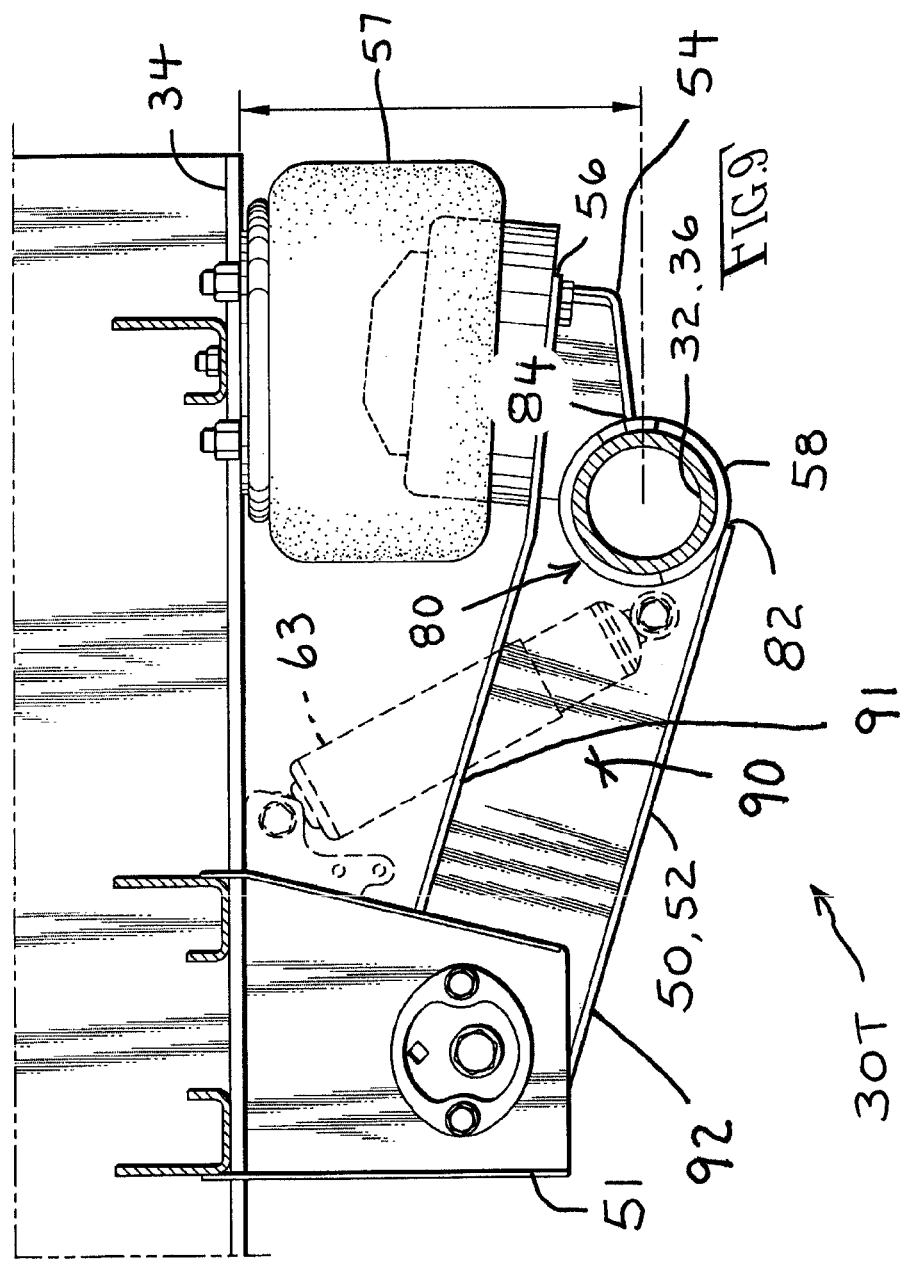

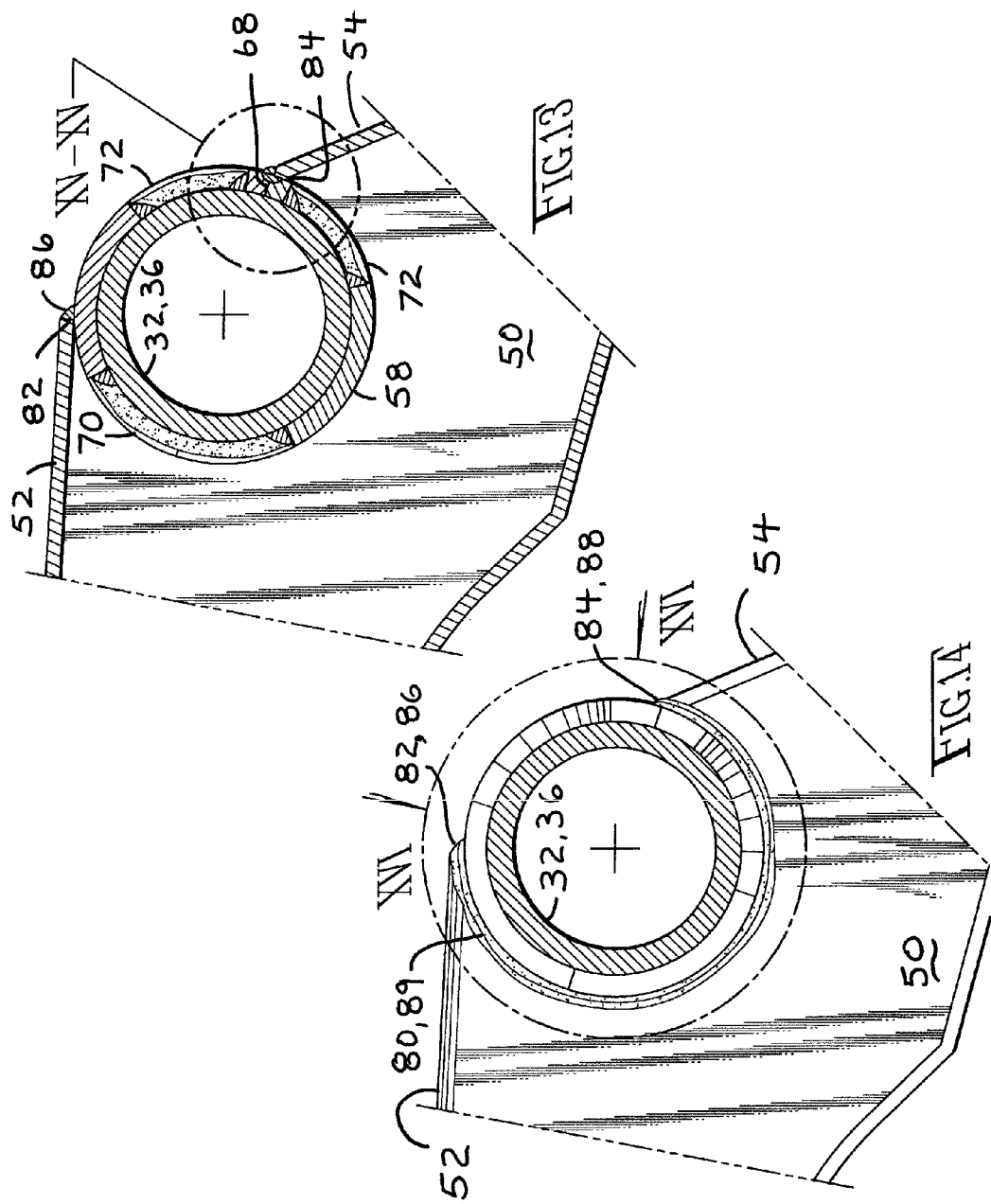

LATERAL-STABILITY PROMOTING SEMI-TRAILER SUSPENSION

CROSS-REFERENCE TO PROVISIONAL APPLICATION(S)

This application is a continuation of U.S. patent application Ser. No. 13/317,772, filed Oct. 27, 2011, which is a continuation-in-part of U.S. patent application Ser. No. 13/068,417, filed May 10, 2011; which claims the benefit of U.S. Provisional Application No. 61/395,665, filed May 17, 2010. All the foregoing patent disclosures are incorporated herein by this reference thereto.

BACKGROUND AND SUMMARY OF THE INVENTION

The invention relates to semi-trailer suspensions and, more particularly, to a semi-trailer suspension that has multiple provisions for promoting lateral stability.

It is an object of the invention to reduce the vehicle track "offsets" of a semi trailer's axle beam.

It is another object of the invention to increase the lateral stability of a semi-trailer's suspension in part by the reduction in the vehicle track 'offsets.'

It is a further object of the invention to reduce the stress in the suspension and in particular reduce the stress on the welds directly on the axle tube, which in part is enabled by other benefits afforded by the reduction in the vehicle track 'offsets'

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 3 is a perspective view comparable to what is shown in solid line in FIG. 2, except exploded for the most part;

FIG. 4 is an enlarged scale perspective view of an axle sleeve mounted on an axle tube and as encircled in detail IV-IV in FIG. 3;

FIG. 5 is an enlarged scale perspective view of the axle sleeve shown in FIG. 4, with portions of the axle tube shown in phantom lines;

FIG. 6 is a perspective view comparable to FIG. 5 except showing the axle sleeve exploded;

FIG. 7a is a rear elevational view of FIG. 5, showing the weld pattern of the rear weld slots (eg., the half moons) and the rear mating seam;

FIG. 7b is a front elevational view of FIG. 7a, showing the weld pattern of the front weld slot (eg., the oval) and front mating seams;

FIG. 8 is a top plan view of FIG. 2, with some matters removed;

FIG. 9 is an enlarged scale elevational view taken in the direction of arrows IX-IX in FIG. 8, and partly in section;

FIG. 13 is an enlarged scale sectional view of the axle beam and axle sleeve taken through the weld slot centerlines in FIG. 11, with surrounding sections of the trailing beam;

FIG. 14 is an elevation view, partly in section and comparable to FIG. 13, except showing the inboard side-edges of the axle sleeve;

DETAILED DESCRIPTION OF THE PREFERRED EMBODIMENTS

Figure 1:
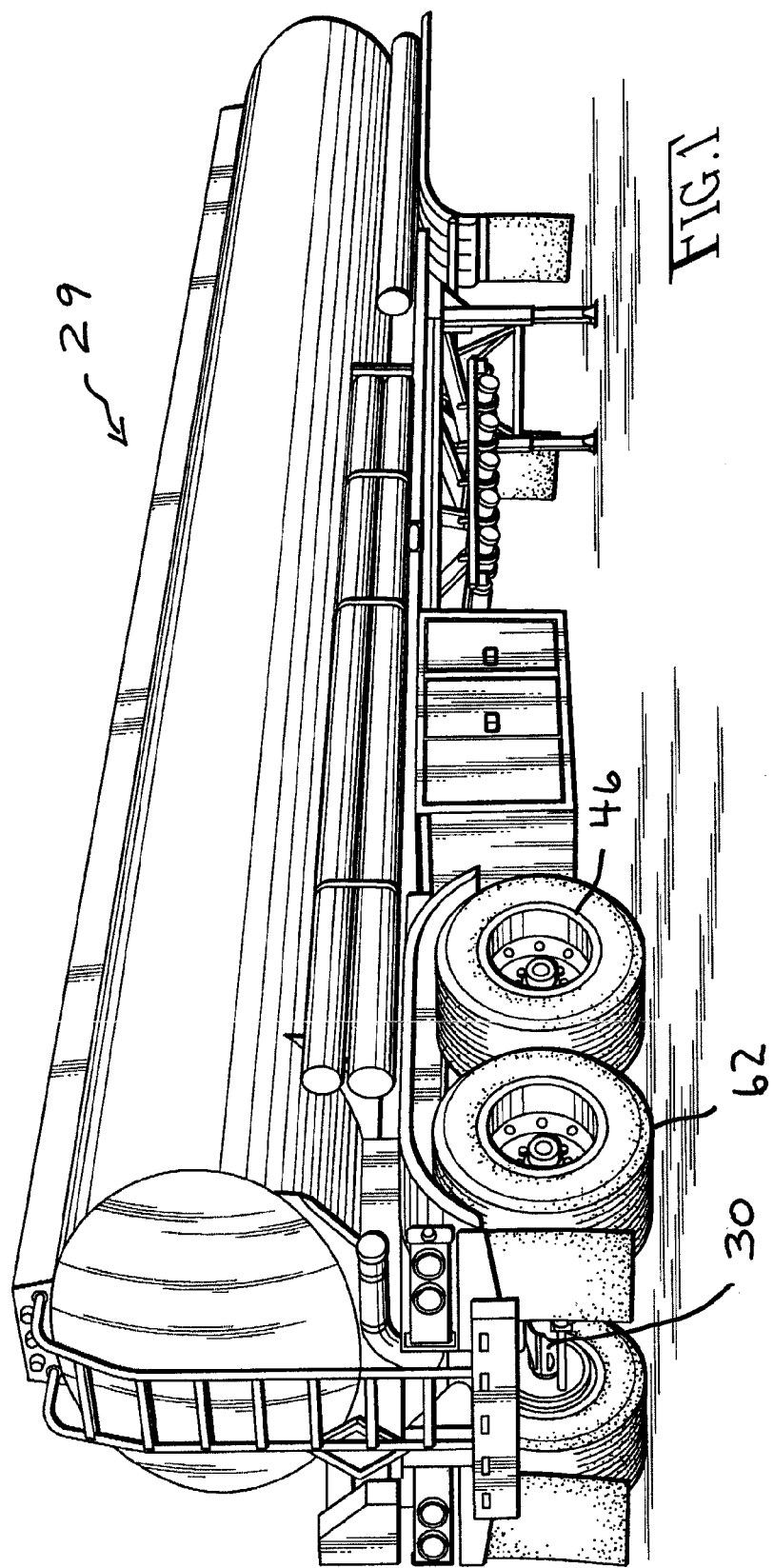
FIG. 1 is a perspective view a fuel tanker semi-trailer that is provided with an axle suspension in accordance with the invention.

FIG. 1 shows a fuel tanker semi-trailer 29 that is provided with a suspension 30 in accordance with the invention. As shown better by FIGS. 2-18, the inventive suspension 30 has multiple provisions for promoting the lateral stability of the semi-trailer. The fuel tanker semi-trailer 29 shown by FIG. 1 has tandem axles. However, for fuel tankers, triple axle trailers are quite common as well.

With general to FIGS. 2-4 and 8-9, the suspension 30 is disposed between an axle beam 32 and a semi-trailer's frame 34. The style of axle beam 32 shown here has a central tube 36 portion flanked by spindle ends 38. There are two popular ways to manufacture axle beams that have a central tube 36 portion flanked by spindle ends 38. One way is to construct the axle beam 32 from three separate pieces, namely, a steel tube disposed between flanking, solid axle spindles. The axle spindles are typically friction welded to the ends of the axle tube. The other popular way is to form the axle beam 32 from a single piece of steel tube. The spindle profiles are formed by swaging in the ends of the tube stock. Regardless how the axle beam 32 is given the profiles for its spindle ends 38, it is the size of the axle tube 36 portion which factors prominently in the "axle beam rating."

Whereas needless to say the 'axle beam rating' corresponds to the rated load-carrying capacity of the axle beam 32, 'axle beam rating' corresponds to the load-carrying capacity of the axle beam 32 only. However, the concept of "load-carrying capacity" is a broader concept than 'axle beam rating' only, and can refer to any of three (3) ratings or, in the alternative, capacities:—
- one, there is the upper limit for highway capacity, informally known as the Bridge Law, which states (among other things) that the maximum trailer weight per axle is to be no more than 20,000 lbs (~9,000 kg) for tandem axle trailers with a ten foot (~3 m) spread between axles, but then only 17,000 lbs (~7,700 kg) if closer;
- two, there is the axle beam capacity; and
- three, there is the suspension capacity.

For the suspension 30 and axle beam 32, capacity in excess of the upper limit for highway capacity is desirable. Sometimes on private property (eg., in industrial complexes) such as where it is lawful to do so, the trailers will be loaded heavier than allowed under the Bridge Law. In consequence, the Bridge Law does not necessarily dictate the capacity that customers want in their suspensions 30 and axle beams 32. Indeed, some amount of overcapacity is desirable.

Figure 11:
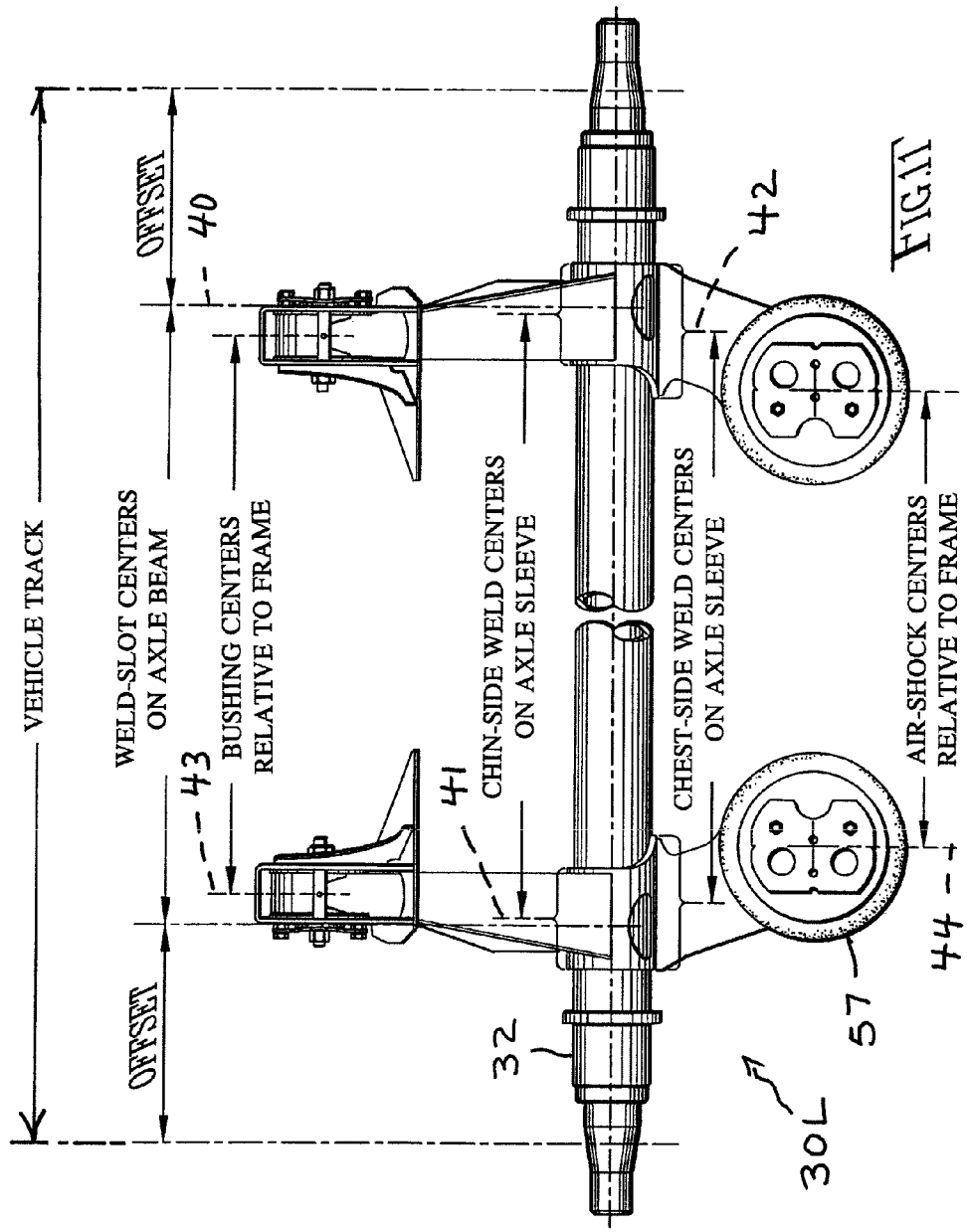
FIG. 11 is a top plan view thereof, and with some matters removed.

The 'axle beam rating' of an axle beam 32 with a central axle tube 36 flanked by spindle ends 38 is based on at least the following factors:—
- (a) wheel configuration (ie., single or dual);
- (b) suspension type (ie., mechanical spring or air ride);
- (c) vehicle track;
- (d) axle tube 36 size (ie., outside diameter and wall thickness);
- (e) suspension mounting centers; and
- (f) offset (wherein 'offset' is interchangeably referred to as 'overhang').

Where and how to measure 'vehicle track' is shown by FIG. 11. For most suspensions, factors (a) through (f) can be readily measured and/or apprised in most contexts. However, for the suspension 30 in accordance with the invention, the factor (e) of 'suspension mounting centers' 40-44 and then also the factor (f) of 'offset' are notionally reckoned in ways which are distinctive over the prior art. Where and how to notionally reckon the 'mounting centers' 40-44 for the suspension 30 in accordance with the invention, and the consequent value for the 'offset' left by the suspension 30's mounting centers 40 on the axle beam 32, are also shown by FIG. 11. But these matters will be more particularly described below following a description of the structure from which the values in FIG. 11 are reckoned.

For the suspension 30 in accordance with the invention,
- (a) the preferred wheel configuration is dual;
- (b) the preferred suspension type is air ride; and
- (c) the nominal vehicle track is 71.5 inches (~1.8 m).

With reference to FIG. 8, dual wheel configurations have an interface between the two wheels 46 on each side of the axle beam 32. Returning again to FIG. 11, the vehicle track is the distance between (1) the interfaces of the left two tires 62 and (2) the interfaces of the right two tires 62. The measurement of 71.5 inches is pretty standard for the industry as a whole. Vehicle track is nearly always the maximum the law will allow.

Given the foregoing, factors (a)-(c) are more or less starting points that are somewhat handed down to a designer by market forces, and are not really customizable design factors. In contrast, factors (d)-(f) are indeed highly-customizable design factors inasmuch as the designer has a menu of options and/or can vary the outcomes in an indefinite number of ways.

For the designer, he or she is offered a menu of options for factor (d), concerning axle tube 36 outside diameter and wall thickness. For axle tube 36 diameter, there are generally two options in the industry:—
- 5 inch (12.7 cm) diameter, or
- 5¾ inch (~14.6 cm) diameter.

Likewise with axle tube 36 thickness, there are options, but in this case there are more than just two generally-accepted options. Industry has standardized the options for wall thickness by giving the options various designations of alphabetic letters. The five most common wall thicknesses for 5 inch (12.7 cm) diameter steel tube (and their respective letter designations) include the following:—
- 0.437 inch L-Wall (~11.10 mm),
- 0.460 inch S-Wall (~11.68 mm),
- 0.580 inch H-Wall (~14.73 mm),
- 0.625 inch E-Wall (~15.88 mm), and
- 0.750 inch T-Wall (19.05 mm).

Hence the designer has at least ten choices for axle tube 36 size. The designer would likely want to select an appropriate size which gives the designer the axle beam rating (ie., load-carrying capacity) that the designer is striving for. The designer may not want to grossly over-design the suspension 30 its axle beam 32, nor certainly not under-design either.

It is an aspect of the invention that factors (e) 'suspension mounting centers' 40-44 and (f) 'offset' are notionally reckoned in ways which are distinguished from the prior art, and obtaining advantages only obtained by the suspension 30 in accordance with the invention. However, that discussion will be paused until further below and after a more particular description of the construction of the suspension 30, as follows.

FIGS. 2-9 shown one version of the suspension 30T while FIGS. 10-18 show an alternate version 30L of the invention. The FIGS. 2-9 version of the suspension 30T comprises a top-mount style of trailer mount. In contrast, the FIGS. 10-18 version of the suspension 30L comprises a low-mount style of trailer mount. The contrast between the two styles of trailer mount are perhaps better shown by contrasting FIG. 9 (top-mount) with FIG. 12 (low-mount). In FIG. 9, the vertical distance between the axle beam 32's center and vehicle frame 34 is much greater than the corresponding measurement in FIG. 12, and hence why this style is referred to as a low-mount.

Figure 2:
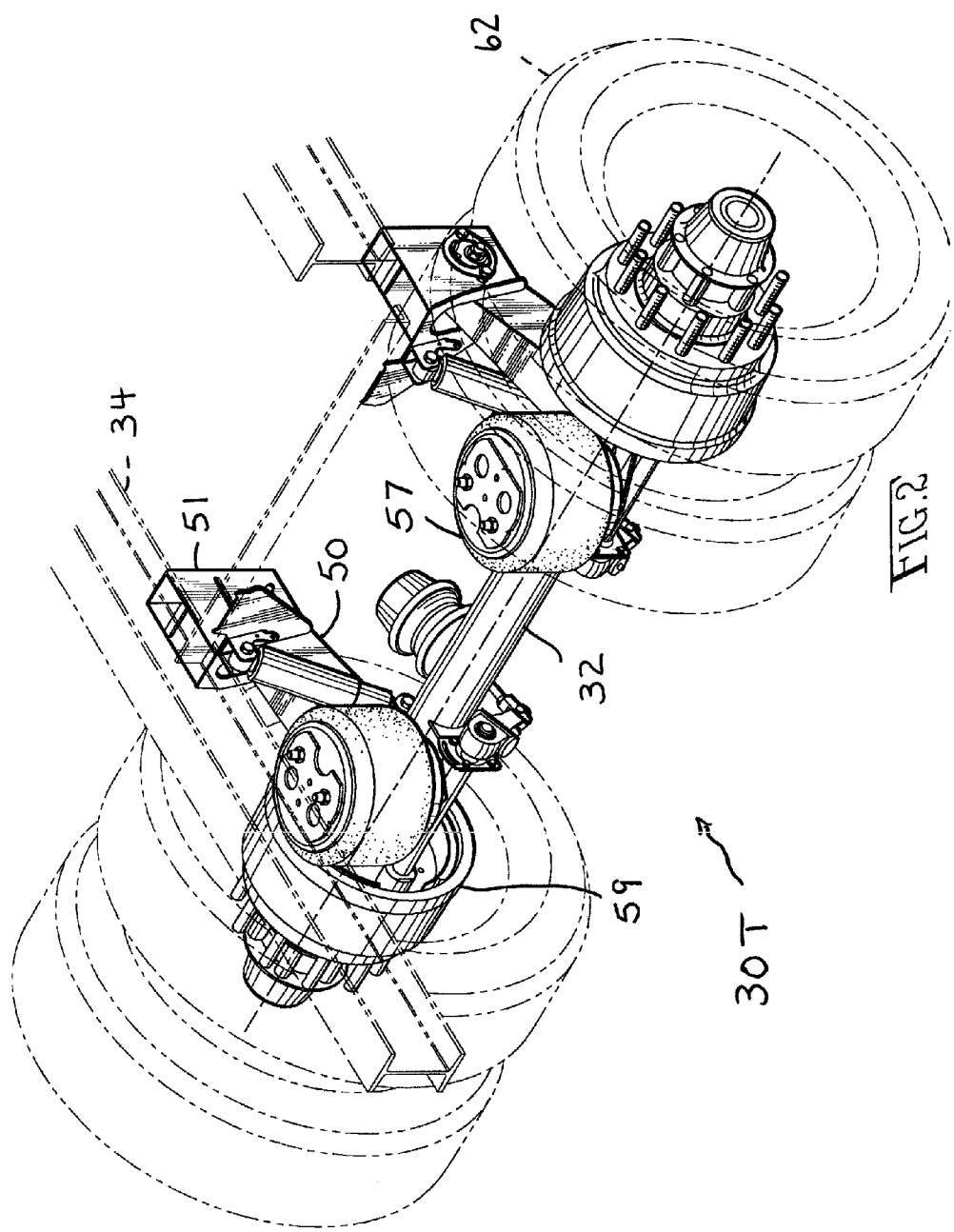
FIG. 2 is a perspective view of the suspension in accordance with the invention, including its multiple provisions for promoting lateral stability, and with other matters shown in phantom lines, wherein this suspension is configured for a top-mount style of trailer mount, in contrast to a low-mount style shown by FIGS. 10-18.
Figure 10:
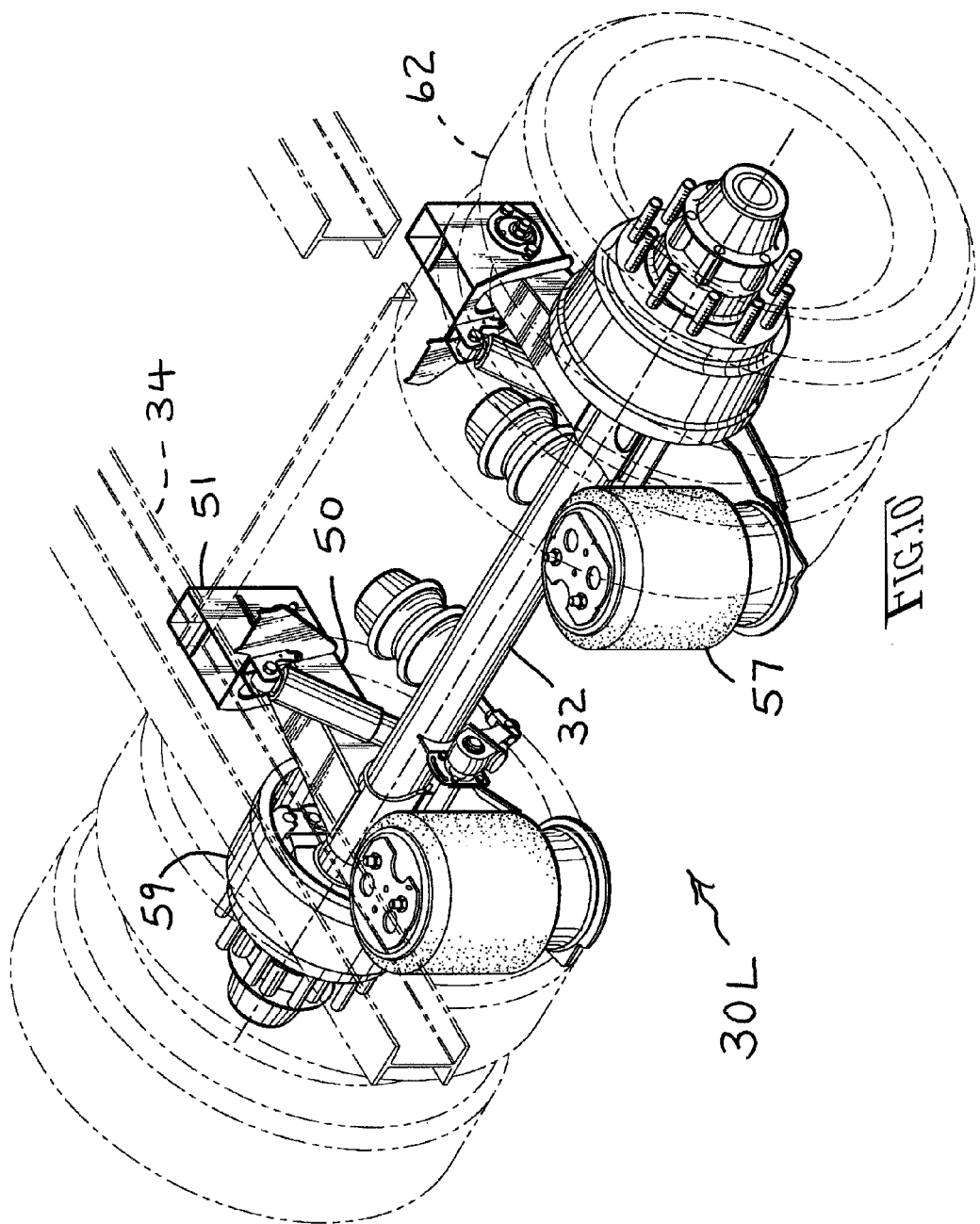
FIG. 10 is perspective view of an alternate embodiment of the suspension in accordance with the invention, which is comparable to the FIG. 2 embodiment except configured for a low-mount style (ie., FIGS. 10-18) and not the top-mount style (ie., FIGS. 2-9)

In spite of differences between the FIG. 2 version of the suspension 30T and FIG. 10 version 30L, both versions pretty much share all the same aspects which are the basis of the inventively distinct aspects of the suspension 30 overall.

With general reference to FIGS. 2 and 3 as well as FIGS. 8 and 9, the suspension 30 comprises left and right trailing beams 50 suspended and pivoted from the vehicle frame 34 by hangers 51. The trailing beams 50 and hangers 51 are, like so many of the other parts to be described herein, preferably fabricated from steel. That is, preferably plate steel is formed by brake presses to fold at fold lines and thereby produce flanges and/or channels. Connections are formed either by fasteners or by welding as more particularly described in any particular instance.

Each trailing beam 50 comprises a head section 52 transforming into a tail section 54. The head section 52 extends from a crown end holding a ring 55 and then from there, rearwardly to the tail section 54, which terminates in a seat 56 for an air spring 57. The ring 55 of the crown end has a resilient bushing is force fitted into it. The bushings of the left and right trailing beams 50 are pivoted to the hangers 51 on the trailer frame 34 by pivot bolts.

Preferably trailing beams 50 are formed into a rectangular tubular construction of the plate steel. The ring 55 of each crown end is welded to the crown end, and each ring 55 is correspondingly (and preferably) formed cylindrically from plate steel.

The head section 52 of each trailing beam 50 trails rearwardly to a welded connection to its axle sleeve 58, and then continuing as the tail section 54 trails rearwardly to a seat 56 for the air spring 57. The air spring 57 is compressed between the vehicle frame 34 above it and the seat 56 underneath it which is on the tail section 54 of the trailing beam 50.

Figure 12:
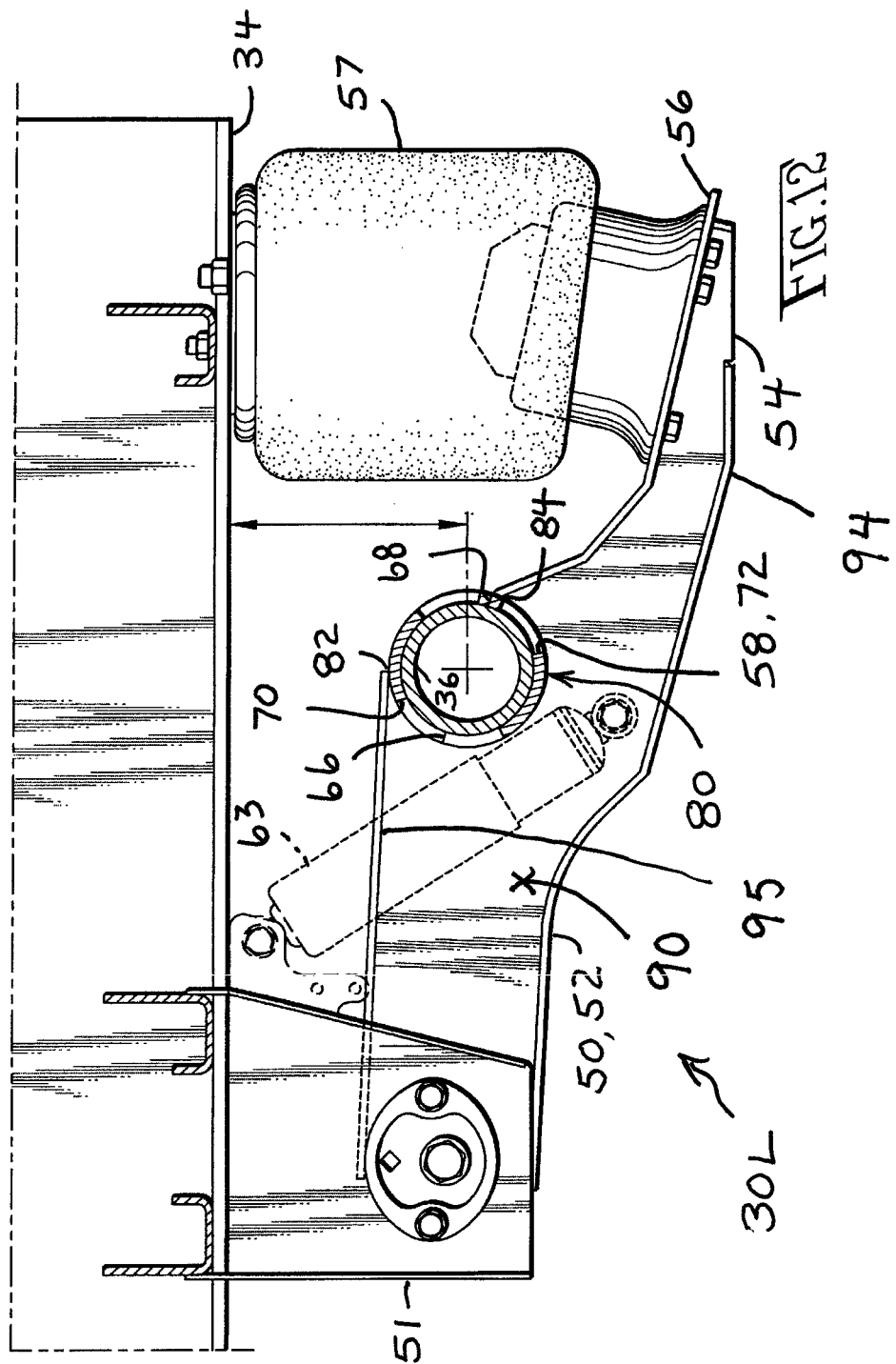
FIG. 12 is enlarged scale elevational view comparable to FIG. 9, except of the low-mount style (ie., FIGS. 10-18) of the suspension and not the top-mount style (ie., FIGS. 2-9)
Figure 15:
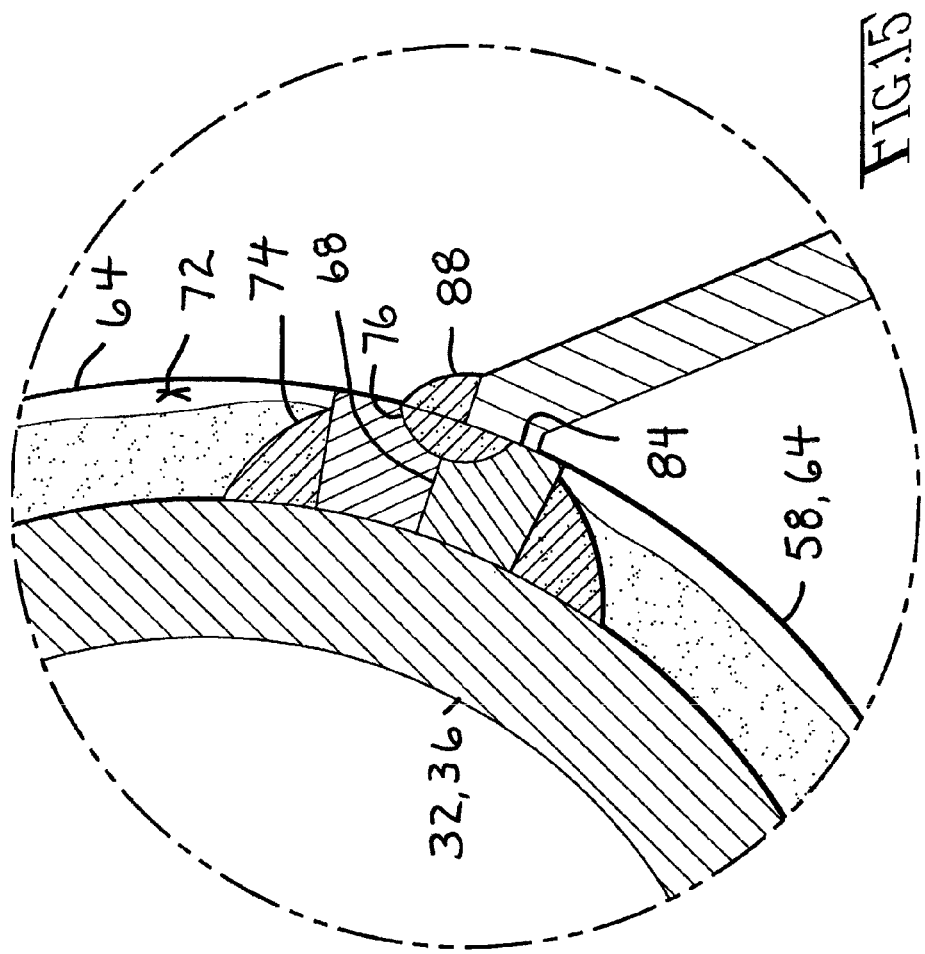
FIG. 15 is an enlarged scale detail view of detail XV-XV in FIG. 13.

FIG. 3 or 9 show better that, for the top-mount version of suspension 30T, each trailing beam 50 has a side panel 90 and top panel 91 of plate steel, which top panel 91 is continuous and uninterrupted from the crown end's ring 55 on through to the seat 56 for the air spring 57. That is in contrast for a bottom panel 93 for the trailing beam 50 because the bottom panel 93 is partitioned by an opening therethrough due to a throat 80 formed in the side panel 90. Alternatively, FIG. 12 shows better that this circumstance is flipped for the low-mount version of the suspension 30L, wherein each trailing arm has a bottom panel 94 of plate steel that is continuous and uninterrupted from the crown end's ring 55 to the seat 56 for the air spring 57. It is the top panel 95 in FIG. 12 that is partitioned by an opening therethrough from the throat 80 formed in the side panel 90.

Other matters which are illustrated in the drawings include a drum 59 for a brake system (drum 59 shown in FIG. 2, brake shoes 61 shown in FIG. 8) forming a hub for mounting wheel rims 46 (see also, eg., FIG. 8) of dual tires 62 on each side of the axle beam 32. And then also, there is preferably a shock absorber 63 for each trailing beam 50, extending between a connection with the hanger 51 and the trailing beam 50 proximate the axle sleeve 58. As FIGS. 9 and 12 show better, preferably the trailing beams 50 and shock absorbers 63 are not pivoted from coaxial pivot axes. Additionally, the brake system comprises a pneumatic actuator (eg., as for driving a pivot-link/slack-adjuster, which rotates a shaft terminating in an S-cam that spreads the brake shoes 61).

FIG. 4 is a rear perspective view of the axle sleeve 58 as it is disposed on the axle beam 32. The axle sleeve 58 forms a full wrap around the entire circumference of the axle beam 32. As FIGS. 5 and 6 show better, the axle sleeve 58 is formed from bi-sections 64 comprising upper and lower cuff sections 64 (or 'cuffs' 64 for short:—wherein, the term 'cuff' is not a term of art). The cuffs 64 have front and rear meeting edges 68 that meet up when assembled together to form the completed axle sleeve 58, as shown in FIG. 4.

FIGS. 5 and 6 show that the upper and lower cuffs 64 are formed with opposite cut-outs through their respective front meeting edges 66, and opposite half-moons proximate their respective rear meeting edges 68. These cut-outs function as weld slots 70 and 72. The front weld slot 70 is preferably an oval or circle (ie., a circle is a special instance of an oval) that is cooperatively formed by both the upper and lower cuff 64. The rear weld slots 72 comprise a pair of crescent-shaped cut-outs (or half-moons), one in each of the upper and lower cuff 64. Each rear weld slot 72 has a major diameter that is slightly gapped away from the respective rear meeting edge 68 of the respective cuff 64 by a thin band of solid material.

FIG. 7a comprises a rear elevation view of the axle beam 32 better showing the weld seams 74 of the axle sleeve 58 to the axle tube 36. In this FIG. 7a, the cuffs 64 are welded to the axle tube 36 by the weld slots 70 and 72 only.

In contrast, the upper and lower cuffs 64 are welded together along a weld seam 76 along the rear meeting edges 68. However, the weld of this weld seam 76 does not penetrate through to and weld into the axle tube 36.

So again, the only places in FIG. 7a where the cuffs 64 are welded to the axle tube 36 is in each of the rear weld slots 72:—and not along the weld seam 76 of the welded rear meeting edges 68.

FIG. 7a also shows better that the upper and lower cuffs 64 are cooperatively formed with shoulder flares 78 which flare inwardly on the axle tube 36. The shoulder flares 78 cooperatively form an inward spike for the axle sleeve 58 as a whole. FIG. 7b comprises a front elevation view of the axle beam 32 better showing the weld seams 74 of the axle sleeve 58 to the axle tube 36 on the front half of the axle tube 36. To compare FIG. 7a (rear view) with FIG. 7b (front view), the front view of FIG. 7b shows no such shoulder flare in the cuffs 64. Hence the shoulder flares 78 serve the purpose to extend the length of the rear meeting edges 68 of the cuffs 64. This affords some of the following advantages. The welded seam 76 formed by the rear meeting edges 68 has a longer length than for the welded seam between the front meeting edges 66. Moreover, the rear meeting edges 68 and the weld seam 76 for them are continuous from the outboard terminus, and on through the shoulder flares 78 until ultimately reaching the inboard terminus. In contrast, the front meeting edges 66 are opened in large part by the front weld slot 70, are really very minimized.

In FIG. 7b (ie., the front view), the only place where the cuffs 64 are welded to the axle tube 36 is in the front weld slot 70:—and not along the welded front meeting edges 66.

More significantly, the welded seam 76 formed by the rear meeting edges 68 floats off of the axle tube 36. The axle sleeve 58 is only fixed to the axle tube 36 at the rear and front weld slots 70. So, during twisting events, the weld slots 70 and 72 fix the axle sleeve 58 tight to the axle tube 36, the axle tube 36 can torsionally distort and displace itself inside and under the shoulder flares 78.

FIGS. 8 and 11 are both top plan views. FIG. 8 shows the top-mount style of the suspension 30T and FIG. 11 the low-mount style 30L. However, FIGS. 8 and 11 show that both styles of the suspension 30T and 30L are arranged very similar to each other from these top plan vantage points.

Figure 19:
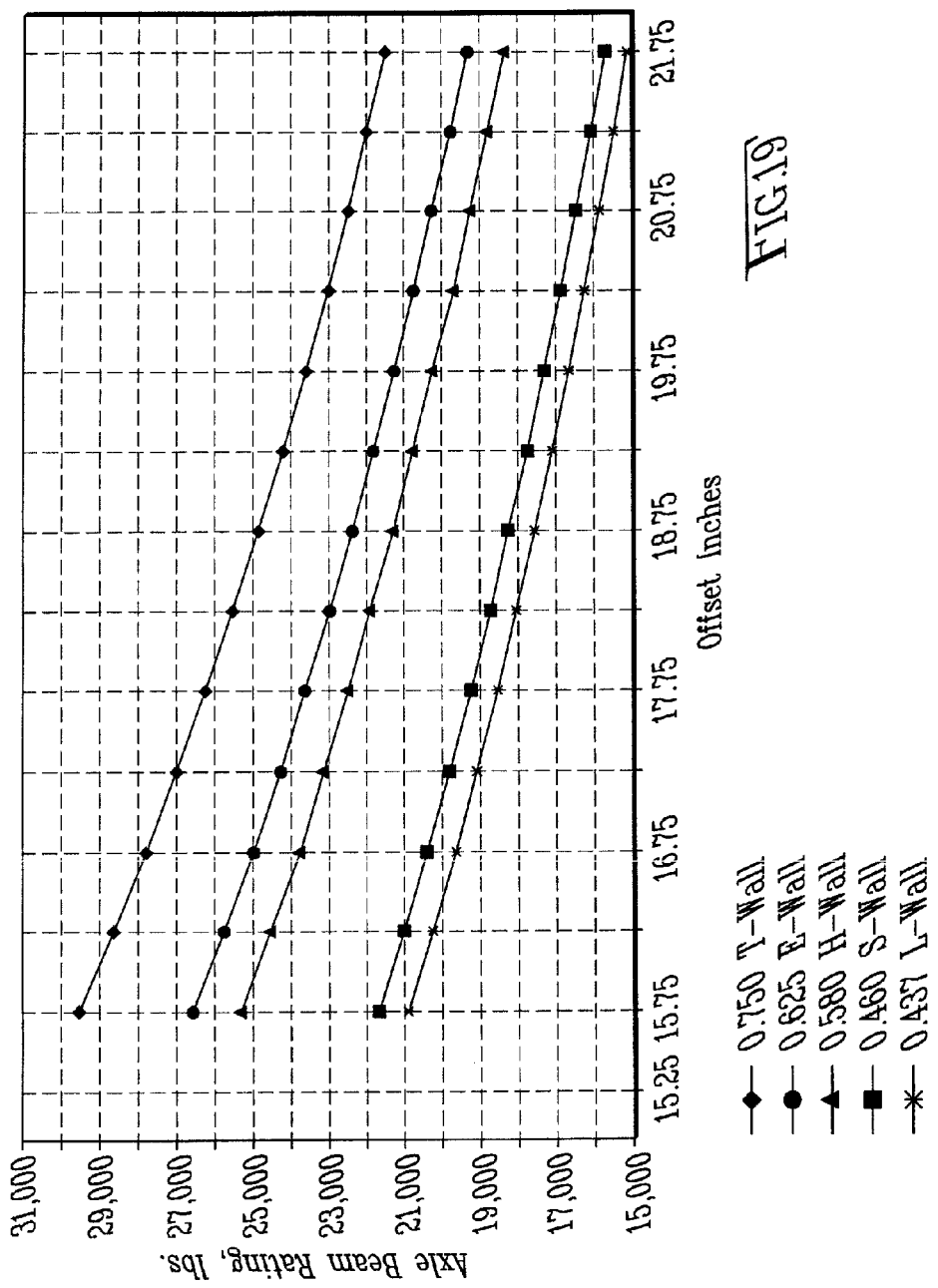
FIG. 19 shows a series of curves on a graph, graphing axle beam rating against offset, wherein each curve represents a different axle wall thickness as indicated.

Looking ahead to FIG. 19, it comprises a graph. In that graph, the axle beam rating of five specified sizes of axle tube 36 are graphed against offset. The source for FIG. 19 comes from a Canadian corporation, IMT Corp. of Ingersoll, Ontario, with a division known as Ingersoll Axles. As mentioned before, the terms 'offset' and 'overhang' are used interchangeably in the industry, and it is believed that the IMT Corp. favors the term "overhang." Regardless, FIG. 19 shows a series of curves for the axle beam rating according to offset for the following sizes of axle tubes:—

0.437 inch L-Wall (~11.10 mm) and 5 inch (12.7 cm) diameter, 0.460 inch S-Wall (~11.68 mm) and 5 inch (12.7 cm) diameter, 0.580 inch H-Wall (~14.73 mm) and 5 inch (12.7 cm) diameter, 0.625 inch E-Wall (~15.88 mm) and 5 inch (12.7 cm) diameter, and 0.750 inch T-Wall (19.05 mm) and 5 inch (12.7 cm) diameter.

Unsurprisingly, the shorter the offset, the higher the axle beam rating for any given wall thickness of 5 inch tube.

Returning to FIGS. 8 and 11, it is an object of the invention to shorten the offset for the suspension 30 in accordance with the invention to what is practicable. A first consideration includes the following:—that is, that it is a preference in accordance with the invention to design the suspension 30 such that the relevant mounting centers 40-44 are as wide as possible. However, a countervailing consideration includes the following two factors. That (1) the inboard edges of the inner rubber tires 62 and (2) the inboard edges of the brake shoes 61 both represent outer limits on the width of the various mounting centers 40-44 of the suspension 30, and hence constrain the width of the various mounting centers 40-44 of the suspension 30 to definite limits:—but not all the same amount of constraint.

Nevertheless, it is an aspect of the invention to widen the relevant mounting centers 40-44 as wide as practicable.

When an axle beam 32 is under load, it flexes into a shallow U-shape. To skip ahead to FIG. 17, it shows a load situation for the axle beam 32 when the semi-trailer 29's right side dual tires 62 have driven up over a curb. Again, the axle beam 32 has flexed into a shallow U-shape. In the industry, this U-shaped flexion is referred to as camber.

Dual tire arrangements can be contrasted to single tire arrangements as follows. Whereas dual tire arrangements distribute the load on an axle beam 32 among four tires 62 instead of two, dual tire arrangements also force the offset to be twice as great (again, for offset, see FIGS. 8 and 11). In other words, the suspension 30 has to be narrower. Hence dual tire arrangements present design challenges. In the industry, the standard offset is 18.75 inches, and it is no coincidence that the value 18.75 inches is in the center value in the chart of FIG. 19.

Pause can be taken before FIG. 11 is more particularly described for what else it shows. This pause is preferably taken to more particularly review FIGS. 9 and 12.

FIGS. 9 and 12 are comparable elevational views of the suspension 30 in accordance with the invention, with FIG. 9 showing the top-mount style 30T and FIG. 12 the low-mount style 30L.

The head section 52 of the trailing beam 50 transforms into the tail section 54 at a throat 80. In FIG. 9, the throat 80 wraps on top of the axle sleeve 58 from about the 6 o'clock position clockwise to about the 3 o'clock position. In FIG. 12, this circumstance is flipped. The throat 80 wraps underneath the axle sleeve 58 from about the 12 o'clock position counter-clockwise to about the 4 o'clock position.

In FIG. 9, the head section 52 has a bottom panel forming a meeting edge with the axle sleeve 58 at about the 6 o'clock position. This is the 'chin' meeting edge. The tail section 54 has a corresponding bottom panel forming a meeting edge with the axle sleeve 58 at about the 3 o'clock position. This is the 'chest' meeting edge. The terms 'chin' and 'chest' are not terms of art. Nevertheless, the axle sleeve 58 is pinched in the throat 80 of the trailing beam 50 and gripped by welded seams 86 and 88 along the chin and chest meeting edges 82 and 84.

FIG. 12 has basically the same arrangement except perhaps inverted. The head section 52 has a top panel forming a meeting edge with the axle sleeve 58 at about the 12 o'clock position. This is the 'chin' meeting edge 82. The tail section 54 has a corresponding top panel forming a meeting edge with the axle sleeve 58 at about the 4 o'clock position. This is the 'chest' meeting edge 84. The axle sleeve 58 in FIG. 12 (as it was in FIG. 9) is pinched in the throat 80 of the trailing beam 50 and gripped by welded seems along the chin and chest meeting edges 82 and 84.

FIG. 13 is a sectional view of the axle beam 32 and axle sleeve 58 taken through the weld slot centerlines 40 in FIG. 11. FIG. 13 furthermore shows the throat 80 of the trailing beam 50, as well as the chin meeting edges 82 and the chest meeting edges 84. The axle sleeve 58 is welded to the axle tube 36 at welds in the weld slots 70 and 72 only. The chin meeting edge 82 is welded to the top of the axle sleeve 58:—which weld seam 86 does not penetrate through to the axle tube 36. How the chest meeting edge 84 is welded as better shown by FIG. 15. The chest meeting edge 84 is welded by a weld seam 88 laid on top of the weld seam 76 of the rear meeting edges 68 of the cuffs 64 of the axle sleeve 58. Again, the chest meeting edge 84 is welded by a technique referred to as welding on top of a weld, or double-pass welding. However, like the situation with the chin weld, the welded seam 88 of the chest meeting edges 84 does not penetrate to the axle tube 36.

Hence the weld seams 86 and 88 of both the chin and the chest meeting edges 82 and 84 float on the outside of the axle tube 36. That way, during twisting events, the weld slots 70 and 72 fix the axle sleeve 58 tight to the axle tube 36, the axle tube 36 can torsionally distort and displace itself inside and under the chin and particularly the chest meeting edges 84, and more particularly underneath the shoulder flares 78 of the axle sleeve 58.

FIG. 14 shows that the throat 80 of the trailing beam 50 is welded circumferentially to the outside of the axle sleeve 58. The welded seam 89 of the throat 80 of the trailing beam 50 does not penetrate to the axle tube 36.

Given the foregoing, the multi-variable concept of 'mounting centers' 40-44 can be more particularly described in connection with FIGS. 11 and 16. To begin with, FIG. 16 is a flat pattern view obtained by unwrapping until flat the view taken by looking radially inward all along circle XVI-XVI in FIG. 14.

Figure 16:
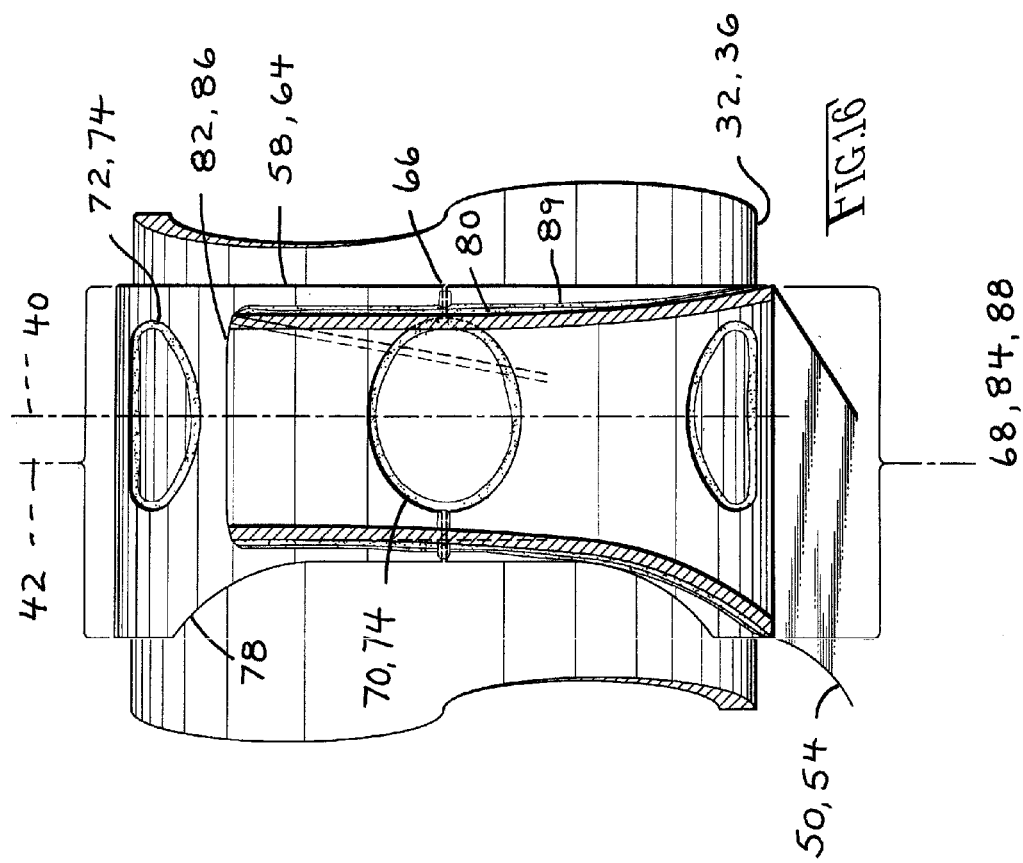
FIG. 16 is a flat pattern view obtained by unwrapping until flat the view taken by looking radially inward all along circle XVI-XVI in FIG. 14.

FIG. 11 shows at least 5 mounting centers 40-44. From narrowest to widest, FIG. 11 shows the following:—
  1— the mounting centers 44 of the air springs 57 to the semi-trailer frame 34;
  2— the mounting centers 43 of the bushings to the semi-trailer frame 34;
  3— the mounting centers 42 of chest meeting edge 84 to the shoulder flares 78 of the axle sleeve 58 along the cuffs 64's rear meeting edges 68;
  4— the mounting centers 41 of the chin meeting edge 82 to the axle sleeve 58 along a line where the axle sleeve 58 is not flared out; and
  5— the mounting centers 40 of the weld slot centers by which the axle sleeve 58 is welded to the axle tube 36;

Although shown in FIG. 11, FIG. 16 shows better that the chest meeting edge 84 is nominally as wide the as rear meeting edges 68 of the shoulder flares 78 of cuffs 64 of the axle sleeve 58. Returning to FIG. 11, it is an aspect of the invention that the chest meeting edge 84 is wider than the chin meeting edge 82 because the chest meeting edge 84 vis-a-vis the air spring 57 supports about four times as much weight as the chin meeting edge 82. That is, for 100% of the weight of the semi-trailer 29 supported by any trailing beam 50, the air spring 57 supports about 80% of that weight, and the bushing about 20%. Hence the air spring 57 applies about four times as much of a load to the chest meeting edge 84 as what the bushing applies to the chin meeting edge 82.

In consequence, it is an aspect of the invention to widen the chest meeting edge 84 in excess of the chin meeting edge 82. The axle sleeve 58's outboard edge is disposed on the axle tube 36 about as far outboard as possible without interfering with other matters like the brake shoes 61 and their mountings. The chest meeting edge 84 is expanded outboard as wide as the axle sleeve 58 will allow. But in order to get the desired width for the chest meeting edge 84, it has to be expanded inboard, and hence the justification for the shoulder flares 78 of the axle sleeve 58.

Nevertheless, this extra inboard expansion of the chest meeting edge 84 relative to the chin meeting edge 82 means that the mounting centers 42 of the chest meeting edge 84 to the axle sleeve 58 is going to be narrower than the mounting centers 41 for the chin meeting edges 82.

However, the widest mounting centers 40 of all are the weld slot mounting centers 40 on the axle tube 36. The weld slot mounting centers 40 are the measurement which determines the 'offset' value for FIG. 19.

Reviewing FIG. 11 once again, the value of 'vehicle track' for dual wheel 46 axle beam 32 setups is pretty standard across the industry, and the standard measurement is about 71.5 inches (~1.8 m). In other words, the standard 'vehicle track' is the limit the law will allow for over-the-road transport. FIG. 19 shows that for a given wall thickness of axle tube 36, a designer can obtain a higher capacity if the 'offset' is minimized.

It is an object of the invention to minimize the 'offest' of the axle tube 36 by widening the weld slot mounting centers 40 to the extent practicable. As FIG. 16 shows, the weld slots 70 and 72 are not laterally centered on the axle sleeve 58, but instead shifted outboard about as far as possible on the axle sleeve 58 without opening into the outboard edge.

FIG. 11 shows that all five mounting centers 40-44 characteristic to the invention are widened to the extent that geometry will practically allow. But what has happened in consequence is that, each of the five mounting centers 40-44 are different from each other. For example, the inner tires 62 crowd the air springs 57 inward to a greater degree than the bushings, hence the mounter centers 44 for the air springs 57 are narrower than the mounting centers 43 for the bushings.

To turn to the chest and chin mounting centers 42 and 41, once again the chest meeting edge 84 is wider than the chin meeting edge 82. Since the outboard terminus for each is in about the same longitudinal (fore to aft, vertical) plane, therefore the inboard terminus of the chest meeting edge 84 is indeed inboard of the inboard terminus of the chin meeting edge 82. Accordingly, the mounting centers 42 for the chest meeting edges 84 are narrower than the mounting centers 41 for the chin meeting edges 82.

But the mounting centers which determine 'offset' as used in FIG. 19 is the weld slot mounting centers 40 as shown in FIG. 11. And these mounting centers 40 are the widest of the characteristic mounting centers 40-44. The relatively wide weld slot mounting centers 40 advantageously allow a designer to select a relatively thin walled axle tube 36 to get the desired load carrying capacity. As more particularly described below, the selection of a thinner wall axle tube over a thicker walled one affords multiple advantages.

Figure 17:
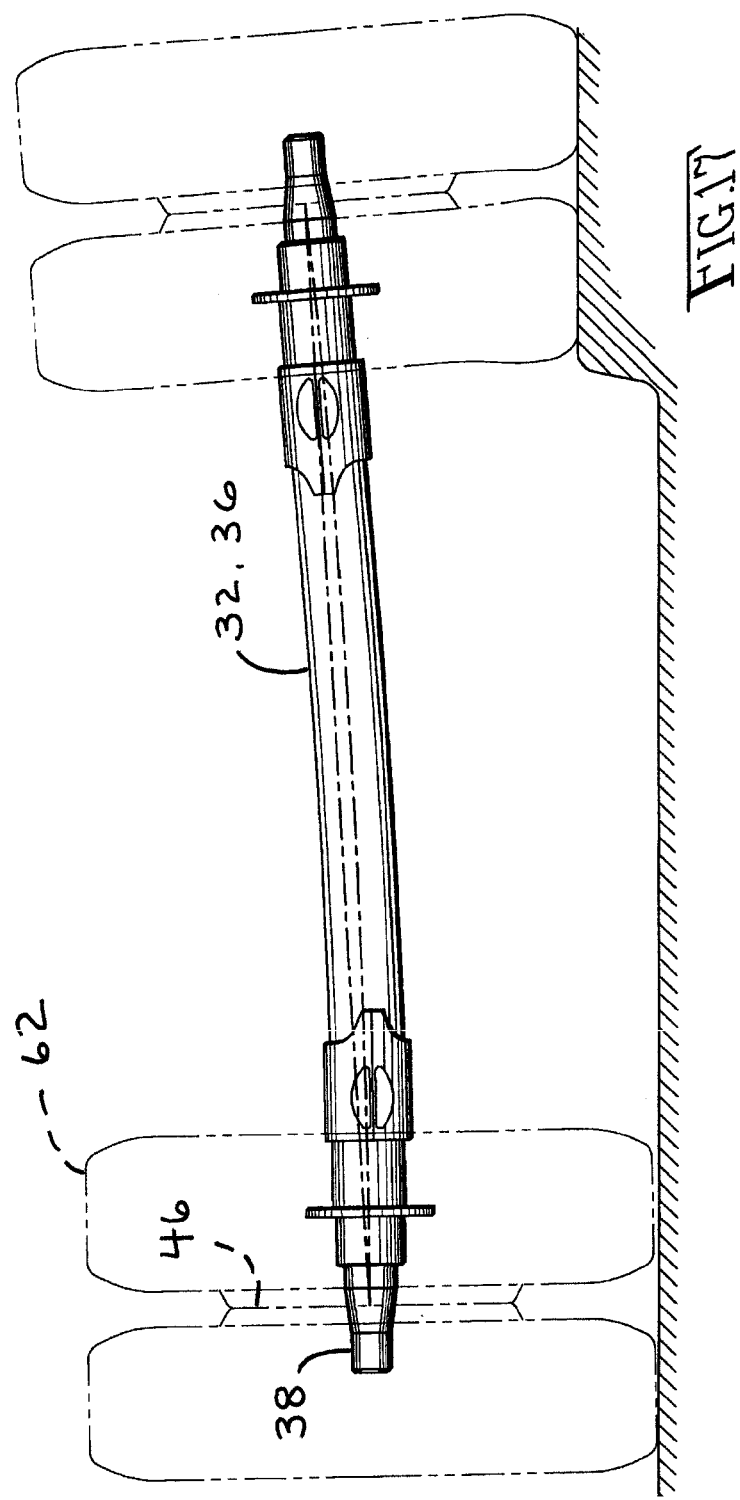
FIG. 17 is a reduced scale rear elevational view of the axle beam when the semi-trailer's right side dual tires have driven up over a curb.
Figure 18:
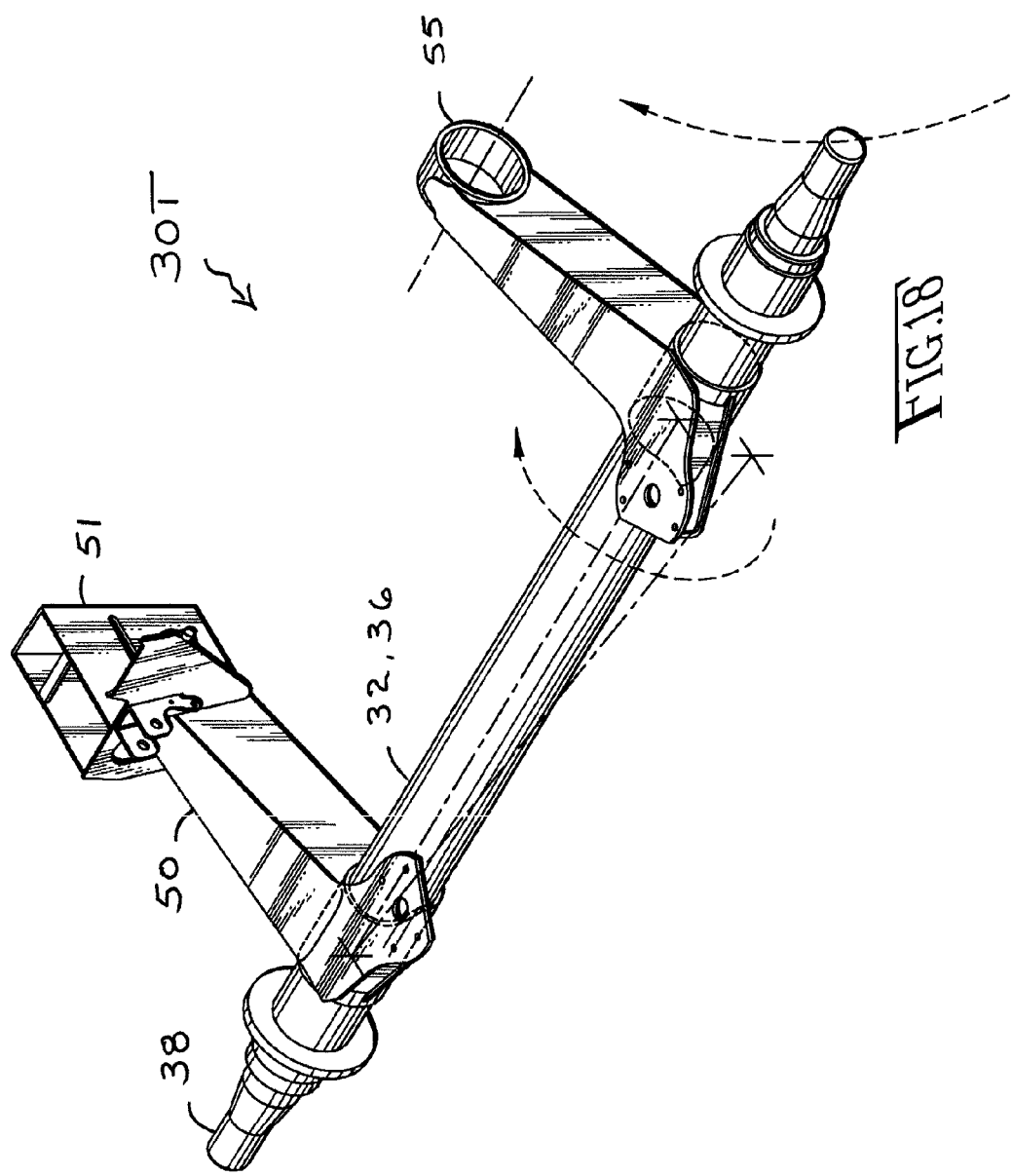
FIG. 18 is a perspective view thereof showing the twist induced in the axle tube.

FIGS. 17 and 18 show various forms of distortion of the axle beam 32 when it is under load. FIG. 17 shows the matter of flexion, which is also referred to as camber. As shown by FIG. 17, the axle beam 32 is flexed in flexion across the whole width of the vehicle track, which includes not only the width between the weld slot mounting centers 40 but also across both flanking offsets.

In contrast, FIG. 18 shows that a different circumstance happens with torsion. The axle beam 32 is not distorted in torsion across the whole width of the vehicle track but, instead, only just across the more narrow width of the weld slot mounting centers 40.

The most significant aspects of the invention are achieved by widening the weld slot mounting centers 40 as wide as possible. To begin with, one direct result is that the offset is reduced by a half inch for every one inch of widening of the weld slot mounting centers 40. Presumptively the designer intends to design the axle beam 32 for an axle beam rating in some excess of the Bridge Law capacity (eg., ~20,000 lbs per trailer axle). FIG. 19 shows that, if the designer can reduce the offset from the industry average of 18.75 inches to 15.75 inches, the designer can not only get by with a slender axle tube (eg., 5 inch O.D. versus 5¾ inch O.D.) and a thinner wall thickness (like perhaps a 0.437 inch L-wall versus a 0.580 H-wall).

One of the more significant values behind the twin benefits of a slenderer axle tube 36 and thinner wall thickness includes the following. The resultant slenderer, thinner-wall axle tube 36 distorts easier in flexion (camber) and twisting (torsion). This more supple axle tube 36 thereby takes a lot of pressure off the welds in the weld slots 70 and 72.

Some final remarks about the suspension 30 in accordance with the invention include the following.

It is an aspect of the invention that the relatively wide apart trailing beams 50 allows the shock absorbers 63 to be placed further outboard on the suspension 30 also thus improves stability.

It is an alternative aspect of the invention that a trailing beam 50 has an axle connection that is greater than the pivot connection (hanger 51) center, and thus reduce the vehicle track "offset".

It is another aspect that the trailing beam 50 has an axle connection that is an inch outboard or more of the pivot connection (hanger 51) center, and so also reduces the axle track "offset".

It is an additional aspect that trailing arm beam has an axle connection that is outboard of the pivot connection (hanger 51) center by an amount of equal to or greater than ¼-th (one-quarter) of the bushing width, and thus additionally reduce the axle track "offset".

It is a further aspect that the trailing beam construction tapers outboard from the pivot connection means (hanger 51) to the axle connection center and then tapers back inboard for the air spring seat 56.

It is an alternative aspect of the invention to provide a trailing beam construction that extends from the pivot means (hanger 51) and has a throat 80 for the axle sleeve 58 connection that is less than axle sleeve 58 diameter and surrounds the axle sleeve 58 joining to a full axle wrap for structural support, thus allowing the axle beam 32 to be integrated with the brake spiders in place on the axle tube 36.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A suspension for a semi-trailer, adapted to be pivoted in part from an underside of a frame of the trailer by spaced left and right hangers thereof; said suspension comprising:
   an axle beam, comprising an axle tube;
   left and right axle sleeves spaced on the axle tube;
   left and right springs; and
   left and right trailing beams;
   wherein each trailing beam comprises a hanger end adapted to couple to the respective hanger therefor, a seat for the respective spring and, intermediate the hanger end and the seat as well as spaced away from the hanger end, a connection to the respective axle sleeve;
   each axle sleeve being disposed on the axle tube at spaced left and right positions therefor;

each axle sleeve being formed with a plurality of weld apertures and having weld seams in the plurality of weld apertures welding the axle sleeve to the axle tube;

wherein the plurality of the welded weld apertures of each axle sleeve for the fully formed suspension that is thereafter ready for over-the-road transport use have a characteristic left and right mounting center (40) consisting of the weld seams in the weld apertures of the left and right axle sleeves respectively, and the trailing beam hanger ends have a characteristic left and right mounting center (43) therefor, and the width between the left and right welded weld aperture mounting centers (40) is wider than for the trailing beams' hanger ends' left and right mounting centers (43).

2. The suspension for semi-trailers of claim 1 wherein:
each axle sleeve and axle tube are welded together only at the weld apertures.

3. The suspension for semi-trailers of claim 1 wherein:
each axle sleeve being formed with a front weld aperture and a rear weld aperture and having weld seams in each of the front and rear weld apertures welding the axle sleeve to the axle tube, and wherein each axle sleeve and axle tube are welded together only at the weld apertures.

4. The suspension for semi-trailers of claim 3 wherein:
the front and rear weld apertures are not laterally centered on the axle sleeve, but instead, are shifted relatively outboard in the axle sleeve.

5. The suspension for semi-trailers of claim 3 wherein:
the axle sleeve has excess portions (78) laterally inboard of the front and rear weld apertures and which have weld seams to the respective left and right trailing beams; and whereby the excess laterally-inboard portions of the axle sleeve float off of the axle tube such that the axle tube can torsionally distort and displace itself during twisting events inside and under the excess laterally-inboard portions of the axle sleeve.

6. The suspension for semi-trailers of claim 3 wherein:
each axle sleeve comprises an upper bisection and a lower bisection which when wrapped around the axle tube meet at front and rear meeting edges, wherein one of the front or rear weld apertures (70 or 72 in FIG. 7B or 7A) comprise an upper aperture and lower aperture (eg., 72 and 72 in FIG. 7A) on spaced sides of the respective front or rear meeting edge (eg., 68 in FIG. 7A) such that said respective front or rear meeting edge (68 in FIG. 7A) can be welded across the whole width of the axle sleeve (58).

7. The suspension for semi-trailers of claim 1 wherein:
each trailing beam comprises a top panel and bottom panel as well as at least one side panel;

said at least one side panel having a circumferential edge defining a throat which extends circumferentially in the side panel between a chin edge and chest edge of the either the top or bottom panel; and each connection between the trailing beams and axle sleeves comprises weld seams extending between the chin edge and axle sleeve, the chest edge and axle sleeve, as well as the circumferential edge and axle sleeve;

wherein the chin edges and chest edges extend between respective inboard and outboard terminations; and the chest edges are substantially wider than the chin edges whereby the weld seams between the seats and chest edges support proportionately more of the load supported by the springs, which proportionately support more of the load than supported by the hanger ends.

8. The suspension for semi-trailers of claim 7 wherein:
each trailing beam comprises another side panel in addition to said one side panel;

said other side panel having a circumferential edge defining a corresponding other throat that extends circumferentially in said other side panel between the chin edge and chest edge of the either the top or bottom panel; and each connection further comprises a weld seam extending between the circumferential edge of said other side panel and the axle sleeve.

9. The suspension for semi-trailers of claim 7 wherein:
the axle sleeves extend between inboard edges and outboard edges; and the inboard edges are formed with a shoulder flare such that the axles sleeves have a wide section thereacross to meet the chest edges and a relatively narrower section thereacross to meet the chin edges.

* * * * *